US006684716B2

(12) United States Patent
Ohnishi et al.

(10) Patent No.: US 6,684,716 B2
(45) Date of Patent: Feb. 3, 2004

(54) CORIOLIS FLOWMETER

(76) Inventors: Kazumasa Ohnishi, 121-35, Hanazonohigashi 2-chome, Nagaoka-shi, Niigata (JP), 940-0846; Yoshiro Tomikawa, 2-3-1, Rinsenji 2-chome, Yonezawa-shi, Yamagata (JP), 992-0062

(*) Notice: Subject to any disclaimer, the term of this patent is extended or adjusted under 35 U.S.C. 154(b) by 165 days.

(21) Appl. No.: 09/853,586

(22) Filed: May 14, 2001

(65) Prior Publication Data
US 2002/0020228 A1 Feb. 21, 2002

Related U.S. Application Data

(63) Continuation-in-part of application No. 09/827,913, filed on Apr. 9, 2001, now abandoned.

(30) Foreign Application Priority Data

Apr. 7, 2000 (JP) ........................ 2000-142552
May 12, 2000 (JP) ........................ 2000-179105

(51) Int. Cl.[7] ............................... G01F 1/84
(52) U.S. Cl. ............................... 73/861.357
(58) Field of Search ............... 73/861.357, 861.355, 73/861.356, 861.01, 861.02

(56) References Cited

U.S. PATENT DOCUMENTS

| 4,738,143 A | * | 4/1988 | Cage et al. | 73/761.38 |
| 5,253,533 A | * | 10/1993 | Lam et al. | 73/861.37 |
| 5,323,658 A | * | 6/1994 | Yao et al. | 73/861.37 |
| 5,351,561 A | * | 10/1994 | Wenger et al. | 73/861.38 |
| 5,531,126 A | * | 7/1996 | Drahm | 73/861.357 |
| 5,691,485 A | * | 11/1997 | Endo et al. | 73/861.357 |
| 5,753,827 A | * | 5/1998 | Cage | 73/861.356 |
| 6,006,609 A | * | 12/1999 | Drahm | 73/861.357 |

* cited by examiner

Primary Examiner—Edward Lefkowitz
Assistant Examiner—Jewel V. Thompson
(74) Attorney, Agent, or Firm—Nixon Peabody LLP; Jeffrey L. Costellia

(57) ABSTRACT

A sensitivity of a Coriolis flowmeter, which is also utilizable as a density meter, composed of a straight conduit through which a fluid to be measured flows, and two counter straight rods that are aligned on both sides of the conduit in parallel, in which one end of the conduit and each one end of the counter rods are fixed to a common support block and another end of the conduit and each another end of the counter rods are fixed to another common support block, is improved by providing to each of the conduit and counter rods a vibration generator for generating vibrations in such manner that the conduit and the counter rods vibrate in opposite phase, and by fixing both support blocks onto a rigid substrate.

9 Claims, 10 Drawing Sheets

(a)                    (b)

(a)

(b)

(a)

(b)

(a)

(b.)

(a)

(b)

CORIOLIS FLOWMETER

CROSS-REFERENCE TO RELATED APPLICATION

This application is a continuation-in-part of U.S. application Ser. No. 09/827,913 filed Apr. 9, 2001, which is now abandoned.

FIELD OF THE INVENTION

The invention relates to a Coriolis flowmeter and further relates to a density meter utilizing the Coriolis flowmeter.

BACKGROUND OF THE INVENTION

The Coriolis flowmeter is known as a direct mass flowmeter which is designed to work under the known principle that when a conduit through which a fluid to be measured flows is vibrated, a Coriolis force which is proportional to the mass flow rate is generated to give a certain effect to the movement of vibrating fluid. Generally, the Coriolis force is detected in terms of an elastic deformation or distortion of the conduit.

Since the Coriolis force is small as compared with the applied vibration force, it is required to provide a force measurement system to accurately detect the generated Coriolis force with high sensitivity. Therefore, a representative Coriolis flowmeter is designed to have a U-shaped conduit so that an enlarged deformation can be detected. However, the U-shaped conduit has a disadvantageous feature in that the fluid flowing through the U-shaped conduit is apt to undergo a pressure loss. Accordingly, most of the U-shaped conduits have not enough measurement accuracy. Moreover, it is necessary to provide a relatively large space for encasing the U-shaped conduit in a flowmeter.

For the reasons described above, a Coriolis flowmeter employing a straight conduit has been studied.

The straight conduit-Coriolis flowmeters are classified into two types: one is of single conduit type, and another is of plural conduit type. In any types, the conduit (namely, flow tube) is fixed to a supporting frame at each end. Further, a vibration generator for vibrating the conduit is provided to the center portion of the conduit, and a sensor means to detect a small deformation or distortion of the conduit caused by the generated Coriolis force is provided at a position between the vibration generator and the support frame or block.

A structure of a known Coriolis flowmeter of plural conduit type (which is shown in Japanese Patent Provisional Publication No. 3-41319) is illustrated in FIG. 12.

The Coriolis flowmeter of FIG. 12 is composed of a flow tube (i.e., conduit) 3, a counter tube 4b, and a structurally balancing auxiliary tube 4a. The counter tube 4b and auxiliary tube 4a are arranged on each side of the flow tube 3 at parallel with a space. Through the flow tube 3, a fluid to be measured flows. The flowmeter is connected to an outer flow system by means of a flange 1 provided on each side. The flow tube 3, the counter tube 4b, and the auxiliary tube 4a are fixed to a vibration control frame 9 at both ends. The flow tube 3 and the counter tube 4b are designed to have almost same resonance frequency. At the center positions of the flow tube 3 and the counter tube 4b, a vibration generator 5 is provided to give a primary flexural or bending vibration to both tubes. A pair of sensors 6a, 6b are arranged symmetrically on both sides of the vibration generator 5 along the flow tube 3. The sensors 6a, 6b have a function to detect the deformation of the flow tube 3 which is caused by the Coriolis force.

The Coriolis flowmeter having a structure such as that illustrated in FIG. 12 is vibrated by the vibration generator in the primary flexural vibration in which the nodes are placed on the support blocks at both ends of the flow tube. The Coriolis force Fc is expressed as follows:

$$Fc = -2m[\omega] \times [v]$$

[in which, $[\omega]$ is a vector of $\omega$ (frequency) and $[v]$ is a vector of v (flow rate)].

The present inventor has discovered that the conventional Coriolis flowmeter of plural flow tube type cannot show enough sensitivity because vibration loss of the counter tubes occurs and the vibration loss decreases the deformation or distortion of the fluid conduit to be detected to measure the flow rate.

A structure of another known Coriolis flowmeter of plural conduit type (which is shown in Japanese Patent Provisional Publication No. 11-30543) is illustrated in FIG. 13.

The Coriolis flowmeter of FIG. 13 is composed of a flow tube (i.e., conduit) 3, and a pair of counter rods 4b, 4b. The counter rods are arranged on each side of the flow tube 3 at parallel with a space. Through the flow tube 3, a fluid to be measured flows. The flowmeter is connected to an outer flow system by means of a flange 1 provided on each side. The flow tube 3 and the counter rods 4b, 4b are fixed to the flange 1 at both ends. The flow tube 3 and the counter rods 4b, 4b are designed to vibrate in opposite phase by means of vibration generators 5. A pair of sensors 6a, 6b are arranged symmetrically on both sides of the vibration generator 5 along the flow tube 3. The sensors 6a, 6b have a function to detect the deformation of the flow tube 3 which is caused by the Coriolis force.

The present inventor has discovered that the known Coriolis flowmeter having a pair of counter rods cannot show enough sensitivity because vibration loss occurs and the vibration loss decreases the deformation or distortion of the fluid conduit to be detected to measure the flow rate.

The vibration loss analyzed on the Coriolis flowmeter similar to the conventional Coriolis flowmeter of FIG. 13 is illustrated in FIG. 14. The analysis is performed by the known finite-element method. The Coriolis flowmeter of FIG. 13 is modified to have a flange having a length of one-tenth (1/10) of the length of the center fluid conduit (as well as the length of each counter rod).

According to the finite-element analysis, each of the support blocks shows deformation of approximately 5% of the maximum deformation of the fluid conduit under the primary flexural vibration mode, at the position of two-fifths (2/5) from the outer end of each block in the longitudinal direction of the fluid conduit. The deformation of the support block apparently gives adverse effect to the detection of the secondary vibration occurring on the fluid conduit by the Coriolis force, and therefore the sensitivity of the flowmeter lowers.

It is an object of the present invention to provide a mass flowmeter of straight conduit type utilizing the Coriolis force which is improved in its sensitivity.

It is another object of the invention to provide a density meter utilizing the improved Coriolis flowmeter.

SUMMARY OF THE INVENTION

The present invention resides in a Coriolis flowmeter comprising a straight conduit through which a fluid to be measured flows and which has a sensor attached thereto, and two counter straight rods that are aligned on both sides of the conduit in parallel with a space, one end of the conduit and each one end of the counter rods being fixed to a common support block and another end of the conduit and each another end of the counter rods being fixed to another common support block, in which each of the conduit and counter rods has a vibration generator attached thereto for generating vibrations of the conduit and the counter rods in such manner that the conduit and the counter rods vibrate in opposite phase, and both support blocks are fixed onto a rigid substrate.

The Coriolis flowmeter of the invention can also be utilized as a density meter.

The preferred embodiments of the Coriolis flowmeter of the invention are described below.

(1) Each of the counter rods is equivalent to each other.
(2) The counter rod is equivalent to the conduit in a diameter thereof.
(3) Each support block has a length of not less than 1/10, specifically 3/10 of the length of the conduit.
(4) Each support block has a length in the range of 3/10 to 10/10 based on the length of the conduit.
(5) Each support block has a thickness of more than the diameter of the conduit.
(6) Both support blocks have a length equal to each other.
(7) Each support block is fixed onto the substrate via an elastic element.

DETAILED DESCRIPTION OF THE INVENTION

The present invention is further described by referring to the figures given in the attached drawing.

Figure 1:
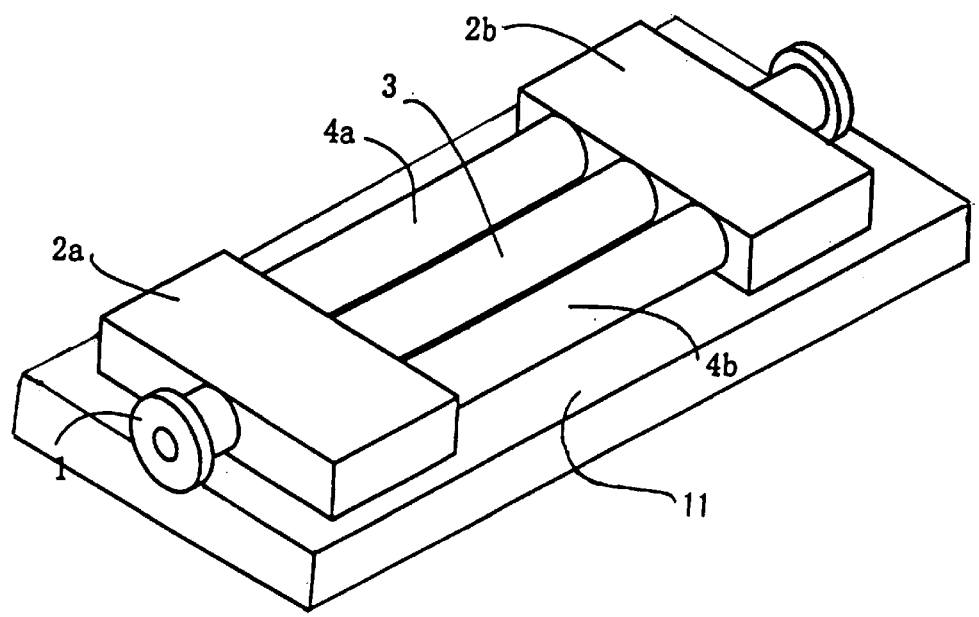
FIG. 1 is a schematic view of a Coriolis flowmeter according to the invention.
Figure 2:
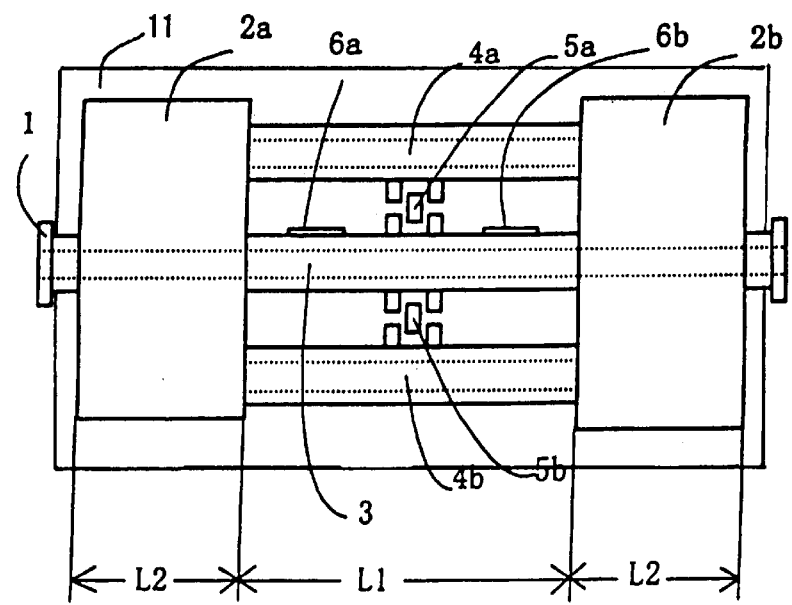
FIG. 2 is a plane view of the Coriolis flowmeter of the FIG. 1, in which vibration generators and a sensor are illustrated.

FIG. 1 is a schematic view of a Coriolis flowmeter according to the invention, and FIG. 2 is a plane view, in which vibration generators and a sensor are illustrated.

The flowmeter comprises a straight conduit 3 through which a fluid to be measured flows, and two counter straight rods (in the form of a hollow tube) 4a, 4b that are aligned on both sides of the conduit 3 in parallel with a space. One end of the conduit 3 and each one end of the counter rods 4a, 4b are fixed to a common support block 2a, and another end of the conduit 3 and each another end of the counter rods 4a, 4b are fixed to another common support block 2b. The fluid conduit 3 is connected to outer fluid-flowing systems by means of a flange 1.

The vibration generators 5a, 5b which may be composed of a magnet and a coil are provided between the fluid conduit 3 and each counter rods 4a, 4b. When one vibration generator 5a works to attract both of the fluid conduit 3 and one counter rod 4a, another vibration generator 5b works to repulse both of the fluid conduit 3 and another counter rod 4b. At a position between the vibration generator 5a and the support block 2a, one vibration sensor 6a is provided to the fluid conduit 3, and at a position between the vibration generator 5a and the support block 2b, another vibration sensor 6b is provided to the fluid conduit 3. The sensors 6a, 6b are placed on both sides of the vibration generator 5a symmetrically in the direction of the fluid conduit 3. The vibration sensor can be composed of a piezoelectric element or a combination of a magnet and a coil.

The support blocks 2a, 2b are fixed onto a rigid substrate such as a metal plate or a ceramic plate.

As is apparent from FIG. 1, the counter rods 4a, 4b can be a hollow tube. However, there is no need of providing a fluid passage in the counter rod. Further, the section of the counter rod can be not only circular but also polygonal or elliptical. Nevertheless, it is preferred that the counter rods 4a, 4b are equivalent to the fluid conduit 3 in the weight and sizes. The weight of fluid conduit 3 means a weight of conduit in which the fluid to be detected is placed.

The support block 2a, 2b, fluid conduit 3, and counter rods 4a, 4b are generally made of metallic material such as stainless steel, Hastelloy (trade name), or titanium alloy. The rigid substrate 11 is generally made of metallic material or ceramics.

In FIG. 2, L1 stands for the length of the fluid conduit 3 (as well as the length of each counter rod 4a, 4b), and L2 stands for the length of the support block 2a, 2b.

Figure 3:
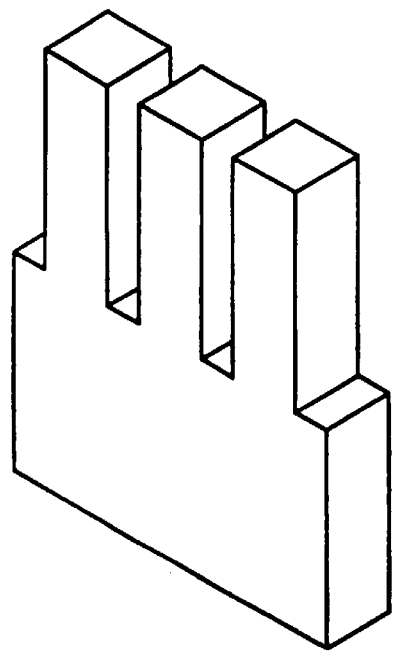
FIG. 3 is a schematic view of a three-forked vibrator which explains the principles of the Coriolis flowmeter of the invention.

The counter rods or tubes of the flowmeter of the invention are arranged on both sides of the fluid conduit symmetrically to show a vibration mode of a three-forked vibrator such as that illustrated in FIG. 3. This arrangement differs from the known counter balance arrangement in which the counter tubes have a resonance frequency identical to the fluid conduit so as to provide a balance only between the fluid conduit and the counter tube or rod. In the flowmeter of the invention, the vibration mode is formulated by the specific combination of the fluid conduit and the counter rods. In the arrangement of the flowmeter according to the invention, the vibration mode employed for detection of the generated Coriolis force corresponds to a flexural secondary vibration of an arm of a three-forked vibrator of FIG. 3. The three-forked vibrator is well known to give a stable vibration and widely employed such as a resonator.

Figure 4:
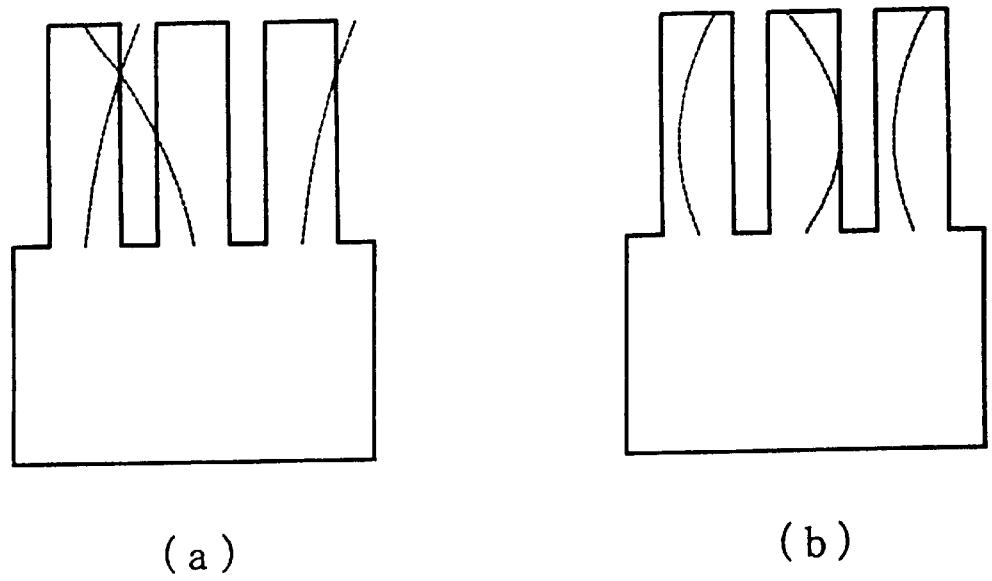
FIG. 4, (a) shows a primary vibration mode of the three-forked vibrator, and (b) shows a secondary vibration mode of the three-forked vibrator.

FIG. 4 shows a primary vibration mode of the three-forked vibrator at (a), and a secondary vibration mode of the three-forked vibrator at (b). The dotted curves indicate a deformation curve.

In the arrangement of the flowmeter of the invention, the primary flexural vibration mode of the three-forked vibrator is employed for generating the vibrations of the fluid conduit and the counter rods, and the secondary flexural vibration mode of the three-forked vibrator is employed for detecting the deformation of the vibration occurring on the fluid conduit.

Figure 5:
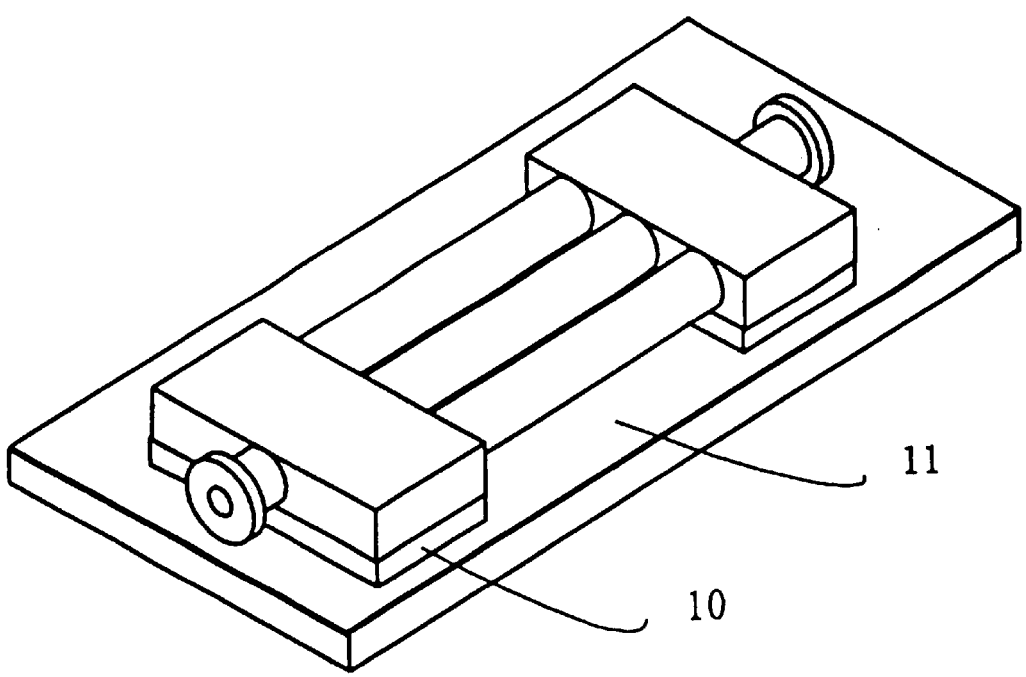
FIG. 5 shows a Coriolis flowmeter of the invention in which the support block is placed on the rigid plate via an elastic element.

FIG. 5 illustrates another structure of the flowmeter of the invention in which each of the support blocks is fixed onto the rigid plate 11 via an elastic element 10 (such as those made of silicone rubber) so as to keep the flowmeter from vibrations supplied from the outer devices.

Figure 6:
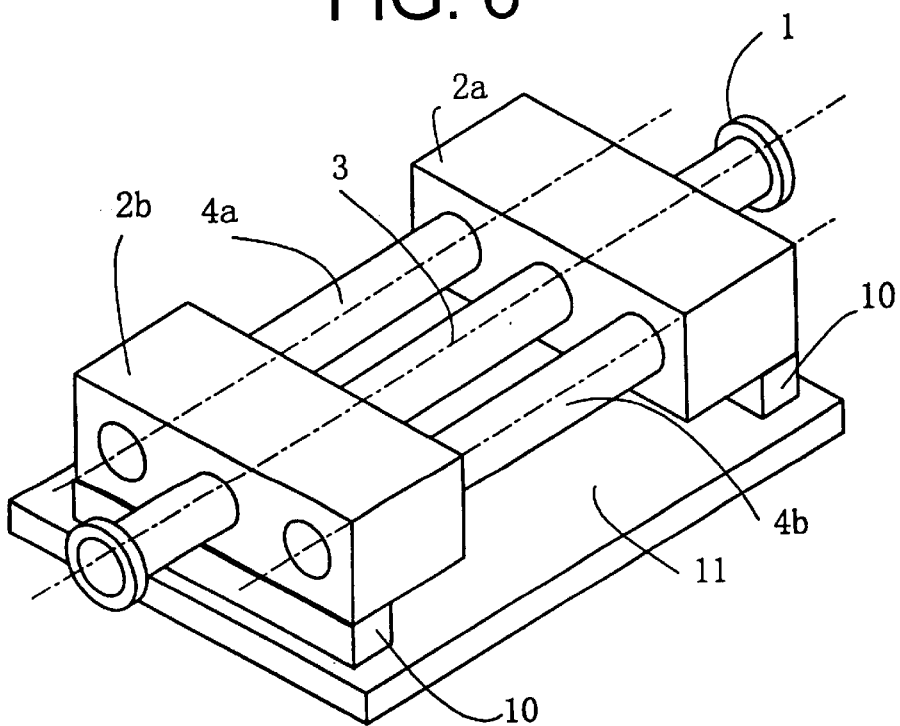
FIG. 6 is a schematic view of another Coriolis flowmeter according to the invention.
Figure 7:
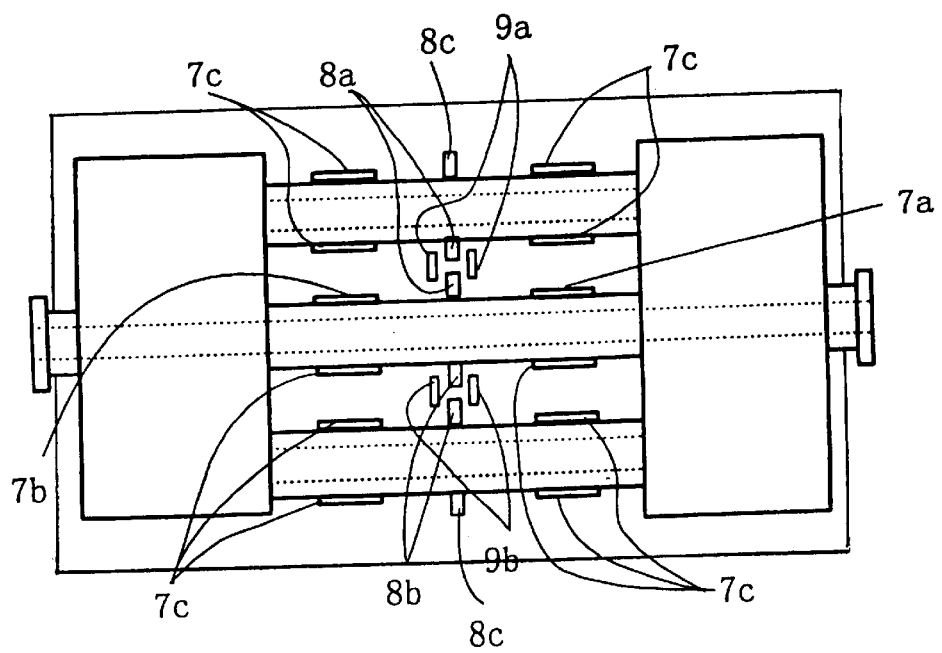
FIG. 7 is a plane view of the Coriolis flowmeter of the FIG. 6, in which vibration generators and a sensor are illustrated.

FIG. 6 and FIG. 7 illustrate one of other structures of the flowmeter of the invention in which each of the support blocks 2a, 2b is fixed onto the rigid plate 11 via an elastic element 10. In the structure of FIG. 6, the thickness of each of the support blocks 2a, 2b is larger than the diameter of the fluid conduit 3 and also larger than the diameter of each of the counter rods 4a, 4b.

The vibration generators which may be composed of combination of a magnet 8a or 8b and a coil 9a or 9b, respectively, are provided between the fluid conduit 3 and each counter rods 4a, 4b. The magnet 8c is provided to the counter rod so that each counter rod can have a balancing weight on both sides and vibrate straight. At positions between the vibration generator and the support blocks, a set of vibration sensors 7c are provided to the fluid conduit and the counter rods. The sensors attached to the counter rods in FIG. 7 are for the sake of balancing the flowmeter in the lateral direction so that the conduit and counter rods vibrate straight on a simple plane.

In FIG. 8 to FIG. 11, the deformations observed on the support block of the flowmeter of FIG. 1 in both of the primary flexural vibration mode and secondary flexural vibration mode in the finite-element analysis are illustrated.

Figure 8:
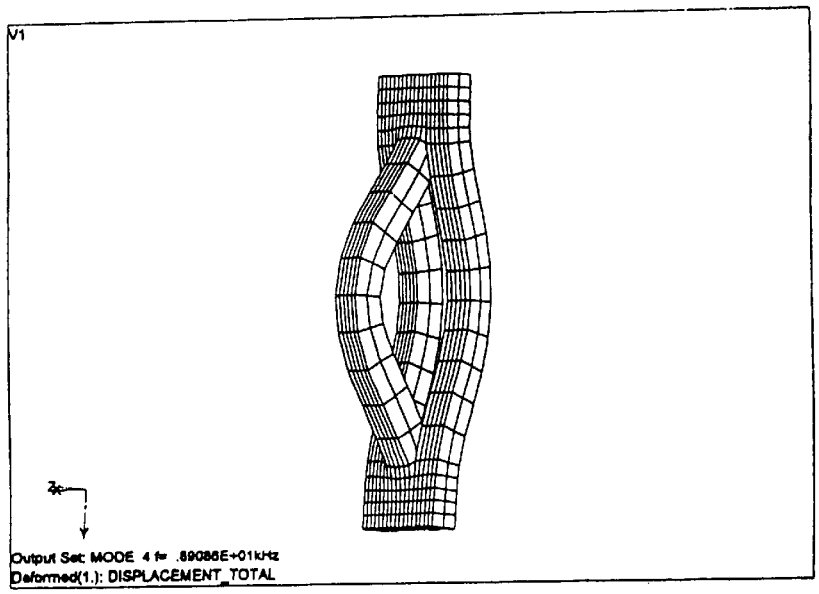
In FIG. 8, (a) shows a deformation of a primary flexural vibration mode in the case that the length of the support block is 2/10 of the length of the fluid conduit, and (b) shows a deformation of a secondary flexural vibration mode in the same case.
Figure 8:
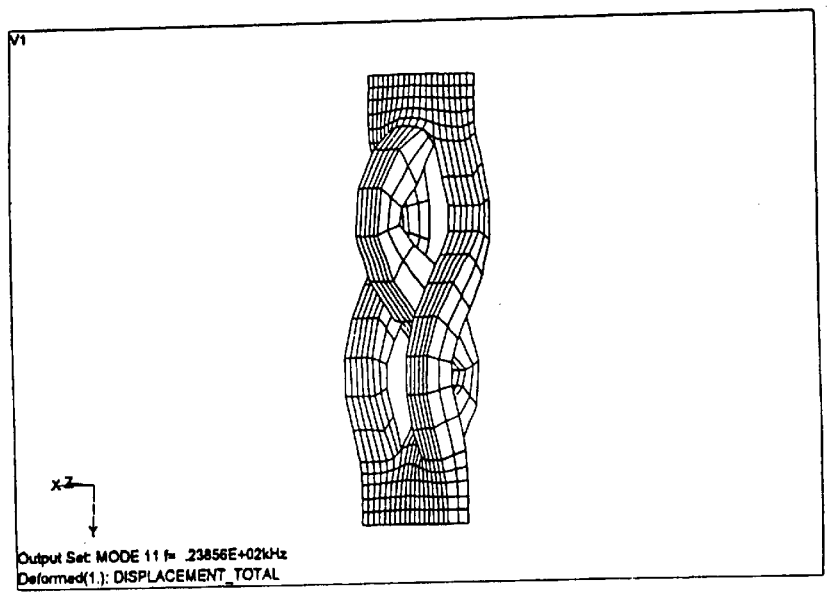

FIG. 8 graphically illustrates the results of finite-element analysis made on the structure that the length (L2) of the support block is $2/10$ (L2/L1) of the length (L1) of the fluid conduit. The deformation given in the primary flexural vibration mode is illustrated at (a) and the deformation given in the secondary flexural vibration mode is illustrated at (b).

In FIG. 8-(a), the support block shows a deformation of not more than 1% of the maximum deformation of the fluid conduit under the primary flexural vibration mode, at the position of two-fifths ($2/5$) from the outer end of the block in the longitudinal direction of the fluid conduit. The deformation of the secondary flexural mode at the position of $2/5$ from the outer end of the block is approximately 5% of the maximum deformation of the fluid conduit. See FIG. 8-(b).

The deformation of approximate 5% observed on the support block in the secondary flexural vibration mode is acceptable.

Figure 9:
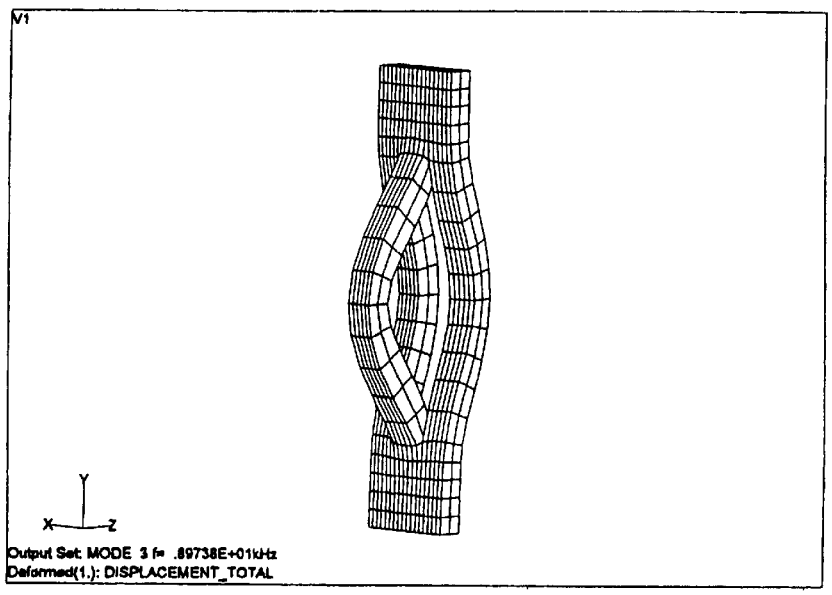
In FIG. 9, (a) shows a deformation of a primary flexural vibration mode in the case that the length of the support block is 3/10 of the length of the fluid conduit, and (b) shows a deformation of a secondary flexural vibration mode in the same case.
Figure 9:
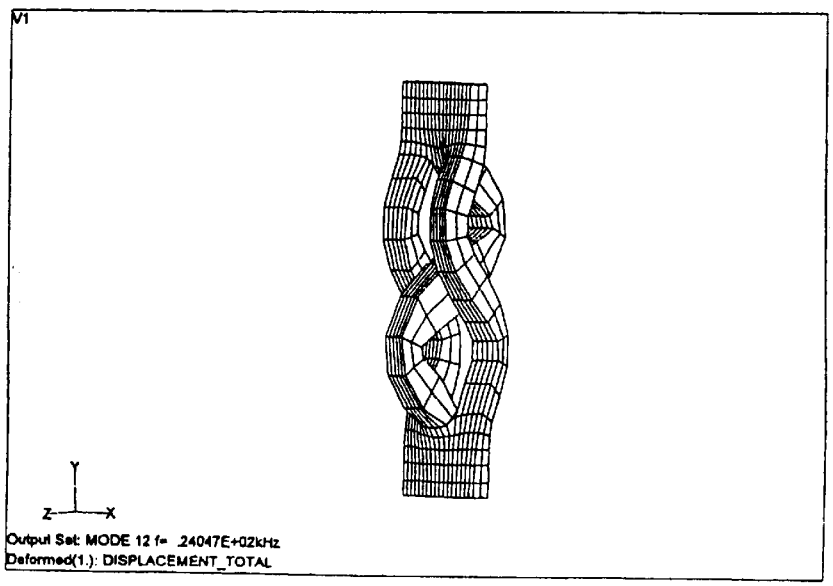

FIG. 9 graphically illustrates the results of finite-element analysis made on the structure that the length (L2) of the support block is $3/10$ (L2/L1) of the length (L1) of the fluid conduit. The deformation given in the primary flexural vibration mode is illustrated at (a) and the deformation given in the secondary flexural vibration mode is illustrated at (b).

In FIG. 9-(a), the support block shows a deformation of not more than 1% of the maximum deformation of the fluid conduit under the primary flexural vibration mode, at the position of two-fives ($2/5$) from the outer end of the block in the longitudinal direction of the fluid conduit. The deformation of the secondary flexural mode at the position of $2/5$ from the outer end of the block is not more than 2% of the maximum deformation of the fluid conduit. See FIG. 9-(b).

The deformation of not more than 2% observed on the support block in the secondary flexural vibration mode is so small as not to adversely influence the deformation of the fluid conduit in the secondary flexural vibration mode which is measured to detect the Coriolis force.

Figure 10:
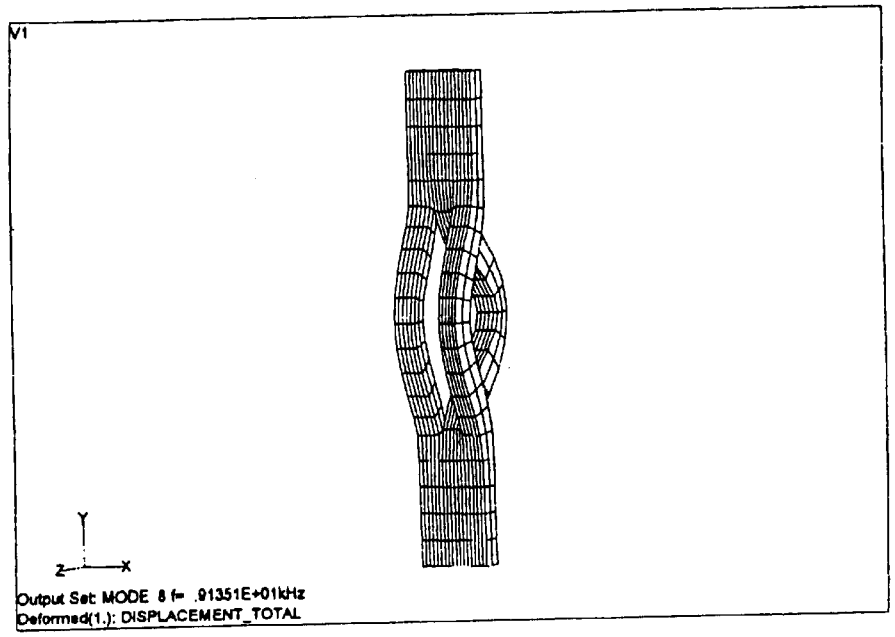
In FIG. 10, (a) shows a deformation of a primary flexural vibration mode in the case that the length of the support block is 6/10 of the length of the fluid conduit, and (b) shows a deformation of a secondary flexural vibration mode in the same case.
Figure 10:
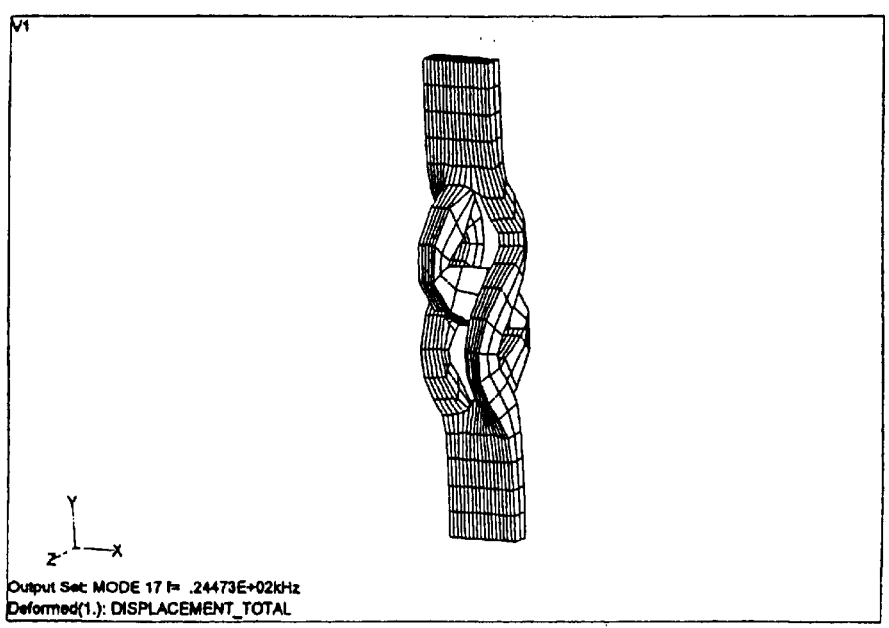

FIG. 10 graphically illustrates the results of finite-element analysis made on the structure that the length (L2) of the support block is $9/10$ (L2/L1) of the length (L1) of the fluid conduit. The deformation given in the primary flexural vibration mode is illustrated at (a) and the deformation given in the secondary flexural vibration mode is illustrated at (b).

In FIG. 10-(a), the support block shows a deformation of not more than 1% of the maximum deformation of the fluid conduit under the primary flexural vibration mode, at the position of two-fives ($2/5$) from the outer end of the block in the longitudinal direction of the fluid conduit. The deformation of the secondary flexural mode at the position of $2/5$ from the outer end of the block is also not more than 1% of the maximum deformation of the fluid conduit. See FIG. 10-(b).

The deformation of not more than 1% observed on the support block in the secondary flexural vibration mode naturally is so small as not to adversely influence the deformation of the fluid conduit in the secondary flexural vibration mode.

The results of FIG. 9 and FIG. 10 indicate that the support block preferably has a length of $3/10$ or more based on the length of the fluid conduit to detect with increased accuracy the Coriolis force occurring on the fluid conduit in the detectable secondary flexural vibration mode with a high sensitivity. Therefore, it is preferred that the length of the support block in the direction along the fluid conduit is as large as possible, so long as the sensitivity of the flowmeter is concerned. However, a disadvantageously large space is required for providing an extremely large support block into a flowmeter. Accordingly, the practically utilizable upper limit of L2/L1 can be approximately $10/10$.

Figure 11:
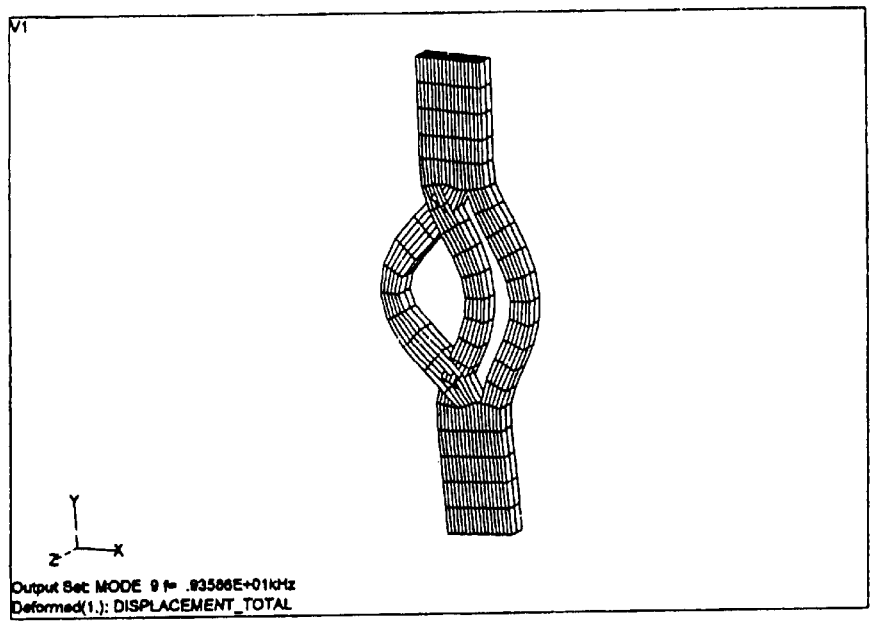
In FIG. 11, (a) shows a primary flexural vibration mode on the plane formed by the fluid conduit and the two counter tube, and (b) shows a secondary flexural vibration mode on the same plane.
Figure 11:
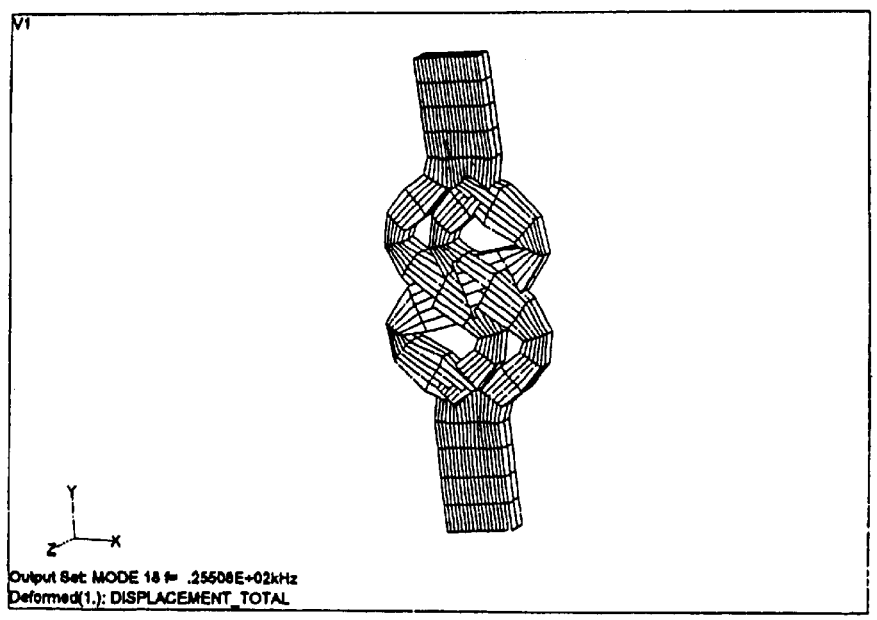
Figure 12:
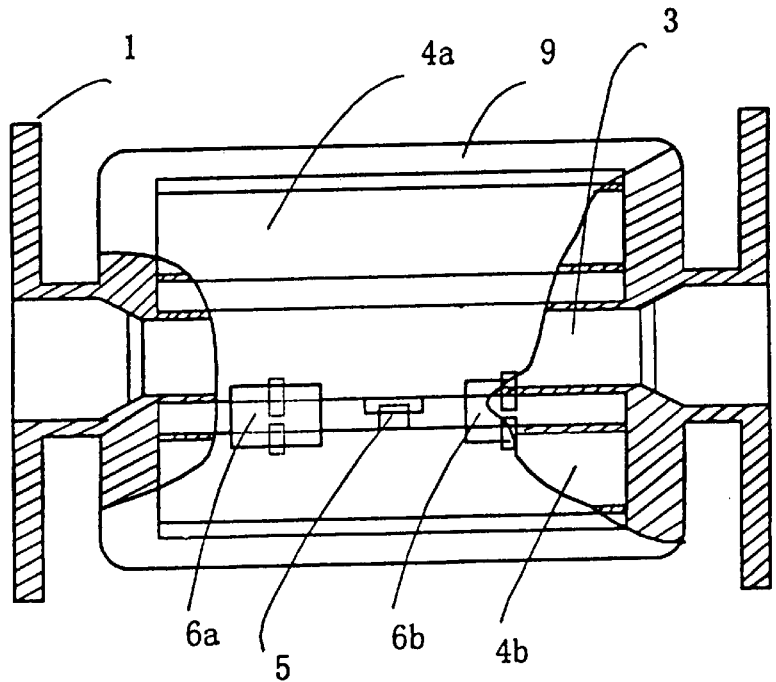
FIG. 12 shows an inner structure of a known Coriolis flowmeter having plural tube.
Figure 13:
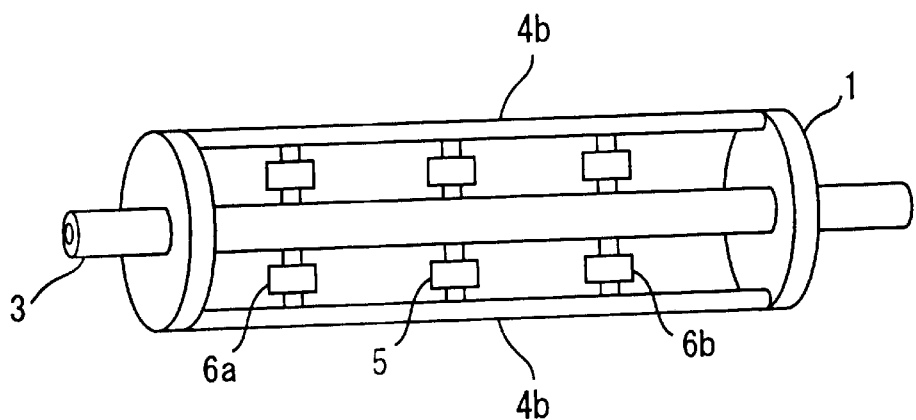
FIG. 13 shows an inner structure of another known Coriolis flowmeter having a flow tube and counter rods vibrating with opposite phase.
Figure 14:
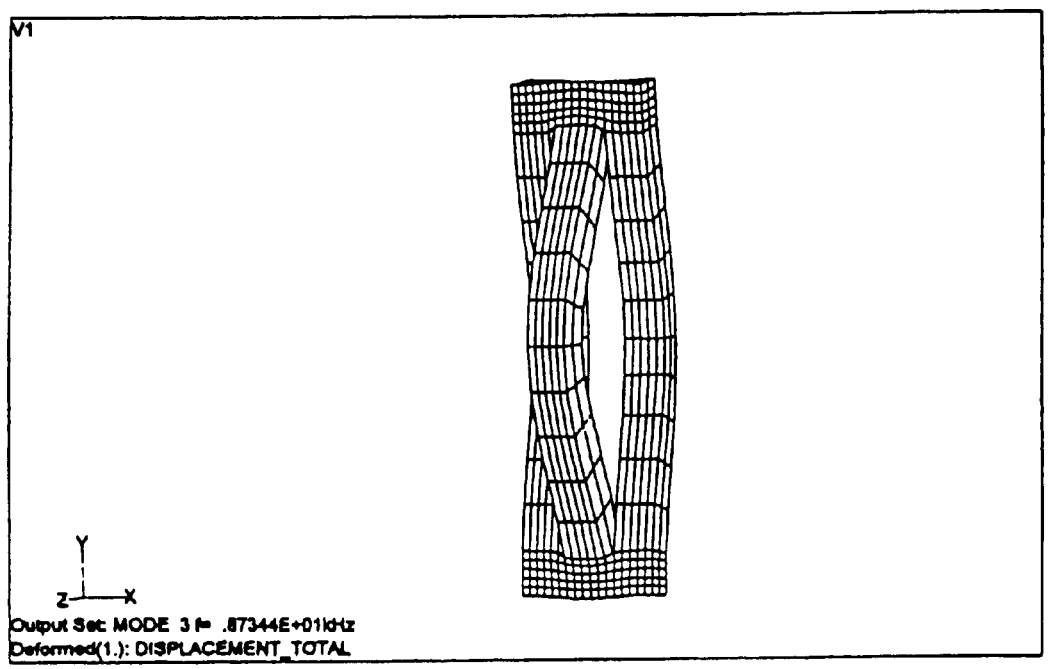
FIG. 14 shows a deformation of a primary flexural vibration analyzed in a Coriolis flowmeter which is similar to the Coriolis flowmeter of FIG. 13.

The flexural vibration modes such as a primary flexural vibration mode and a secondary flexural vibration mode should not be limited to the vibration modes in the direction vertical to the plane formed by the fluid conduit and the two counter rods. In FIG. 11, a primary flexural vibration mode on the plane formed by the fluid conduit and the two counter tube is shown at (a), and a secondary flexural vibration mode on the same plane is shown at (b). Still in this case, the deformation of the secondary flexural vibration mode on the fluid conduit is measured to detect the Coriolis force occurring on the fluid conduit.

What is claimed is:

1. A Coriolis flowmeter which vibrates in a mode of three-forked plate vibration comprising a straight conduit through which a fluid to be measured flows and which has a predetermined resonance frequency and a sensor attached thereto, and two counter straight rods that have the same resonance frequency as the resonance frequency of the straight rod conduit and are aligned on both sides of the conduit in parallel space, one end of the conduit and each one end of the counter rods being fixed to a common support block and another end of the conduit and each another end of the counter rods being fixed to another common support block, in which each of the conduit and counter rods has a vibration generator attached thereto for generating vibrations in such manner that the conduit and the counter rods vibrate in opposite phase, and both support blocks are fixed onto a rigid substrate.

2. The Coriolis flowmeter of claim 1, wherein each of the counter rods is equivalent to each other.

3. The Coriolis flowmeter of claim 2, wherein the counter rod is equivalent to the conduit in a diameter thereof.

4. The Coriolis flowmeter of claim 1, wherein each support block has a length of not less than three-tenths of the length of the conduit.

5. The Coriolis flowmeter of claim 4, wherein each support block has a length in the range of 3/10 to 10/10 based on the length of the conduit.

6. The Coriolis flowmeter of claim 1, wherein each support block has a thickness of more than the diameter of the conduit.

7. The Coriolis flowmeter of claim 1, wherein each support block is fixed onto the substrate via an elastic element.

8. The Coriolis flowmeter of claim 1, which each support block is fixed onto the substrate via an elastic element.

9. A density flowmeter which vibrates in a mode of three-forked plate vibration comprising a straight conduit through which a fluid to be measured flows and which has a predetermined resonance frequency and a sensor attached thereto, and two counter straight rods that have the same resonance frequency as the resonance frequency of the straight conduit and are aligned on both sides of the conduit in parallel with a space, one end of the conduit and each one end of the counter rods being fixed to a common support block and another end of the conduit and each another end of the counter rods being fixed to another common support block, in which each of the conduit and counter rods has a vibration generator attached thereto for generating vibrations in such manner that the conduit and the counter rods vibrate in opposite phase, and both support blocks are fixed onto a rigid substrate.

* * * * *